United States Patent Office 3,437,295
Patented Apr. 8, 1969

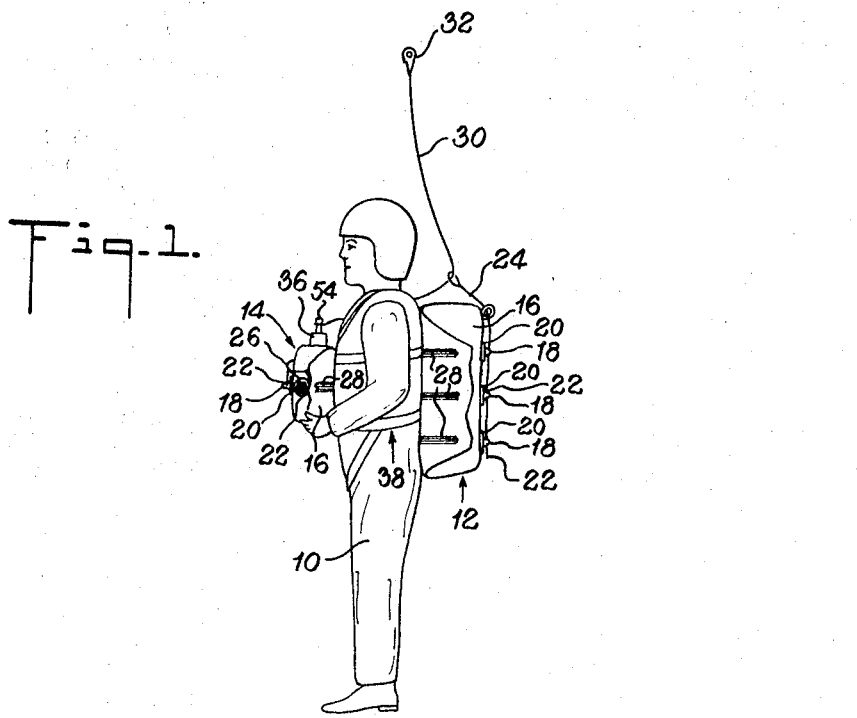
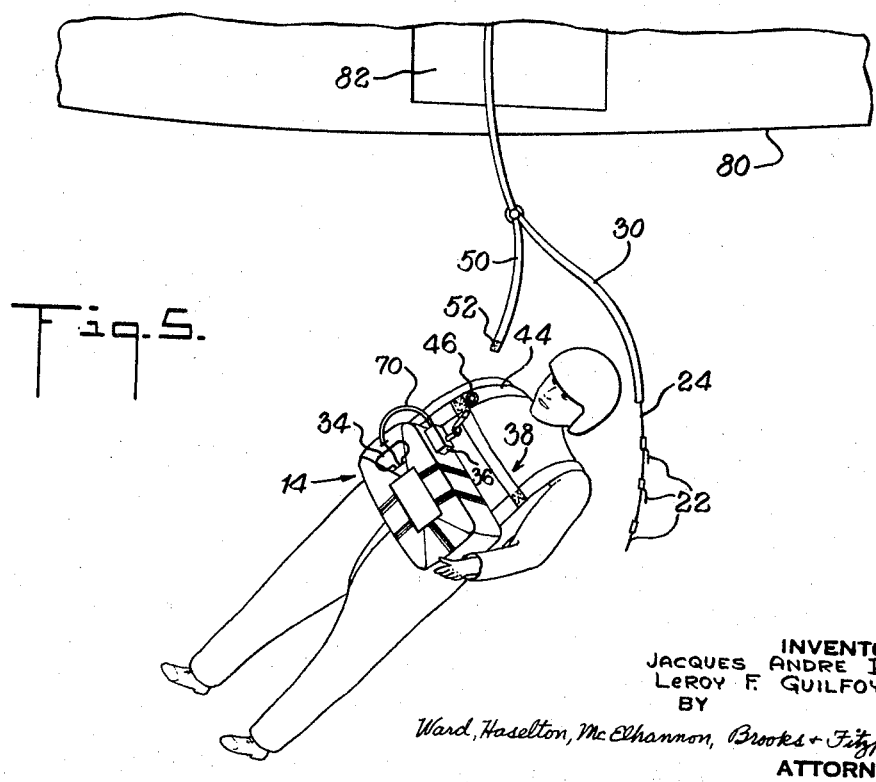

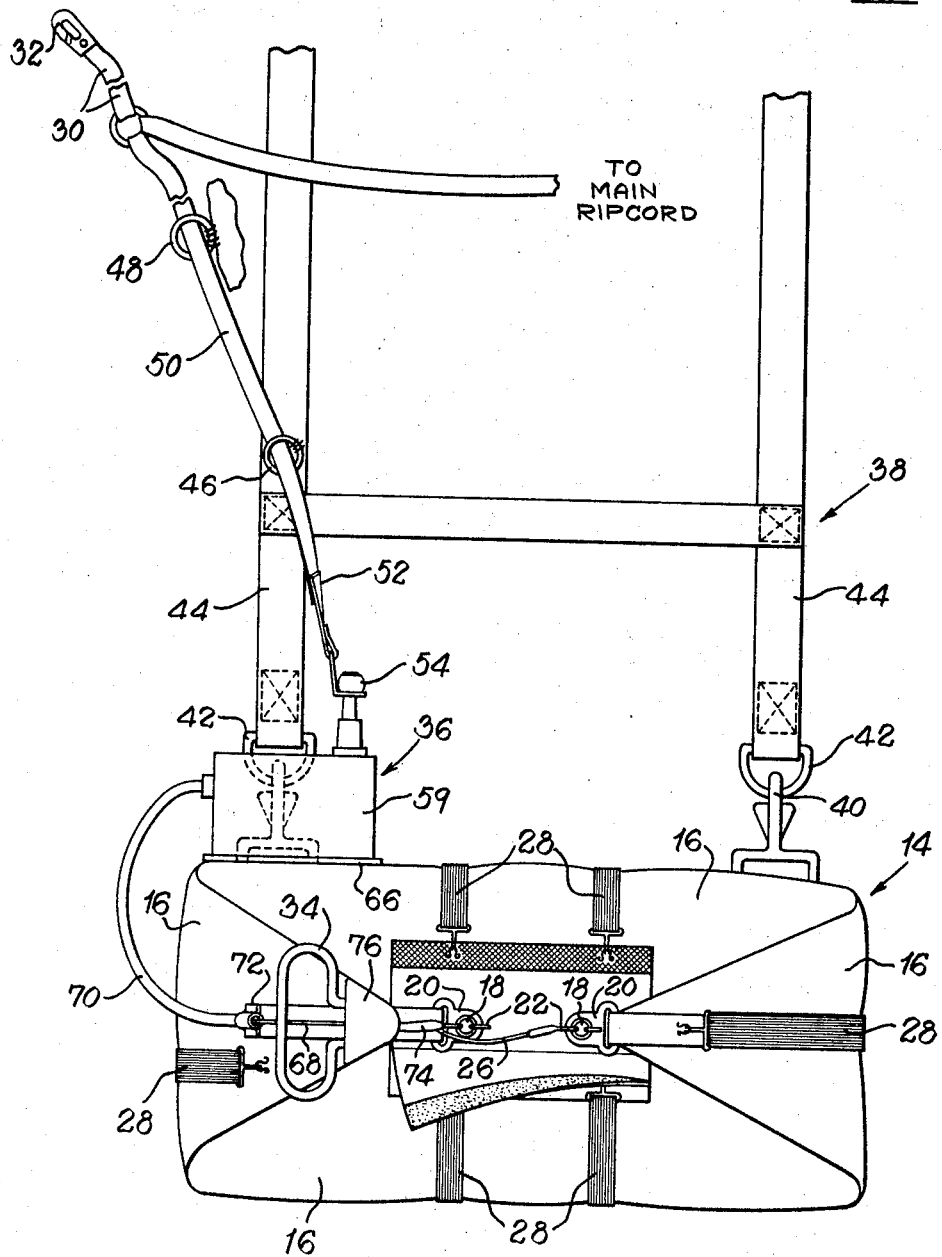

3,437,295
PARACHUTING APPARATUS
Jacques A. Istel, Orange, Mass., and Le Roy F. Guilfoyle, Point Pleasant, N.J., assignors to Parachutes Incorporated, Orange, Mass., a corporation of New York
Filed Oct. 6, 1967, Ser. No. 673,470
Int. Cl. B64d 17/40, 17/58; B66c 1/38
U.S. Cl. 244—148          10 Claims

ABSTRACT OF THE DISCLOSURE

Parachute system for automatically opening a reserve parachute pack in the event that a main parachute malfunctions comprising a reserve ripcord pulling mechanism triggered by a timer which in turn is actuated by the means for pulling the main parachute ripcord.

---

This invention relates to safety devices for parachutes and more particularly it concerns a device for obtaining the automatic opening of a reserve parachute pack in the event of a main parachute malfunction.

The present invention is particularly advantageous in connection with the training of student parachutists. One of the more serious problems encountered in the training of new parachutists is that of ensuring their safe return in the event of a malfunction of their main parachute. Often, an apprehensive student, when faced with the situation of a parachute malfunction, will panic and will fail to maintain sufficient presence of mind to pull the ripcord of his reserve parachute. Since the reserve parachute represents his last remaining chance of survival, the panic problem is one of very grave importance, and unless adequate precautions are taken the consequence could be disastrous. The present invention is directed toward obtaining proper opening of a reserve parachute pack in the event of a main parachute malfunction. With the present invention, the main parachute is provided with an opportunity to open; and if it fails to do so within a predetermined amount of time, then the reserve parachute pack is automatically opened. No conscious effort whatever is needed on the part of the parachutist for this to occur. Further, the reserve pack opening will occur irrespective of the parachutist's attitude at the time of actuation.

The automatic reserve parachute opening feature of the present invention does not interfere with the normal manual manner of opening the reserve parachute pack; so that the reserve pack may be opened manually at any time to override the automatic mechanism.

The present invention involves the provision of a main parachute pack having a main ripcord and a main ripcord pulling means such as a static line. There is also provided a reserve parachute pack having a reserve ripcord and a triggerable pulling mechanism arranged to pull the reserve ripcord. A timing device is mounted on the reserve parachute pack along with the triggerable pulling mechanism; and this is arranged to trip the mechanism after a predetermined time delay. A connecting line is provided between the main ripcord pulling means and the timer. When a parachutist leaves the aircraft, his static line, in addition to pulling the main ripcord, will also pull the connecting line to start the timer. If the main parachute pack has not opened, or if the main parachute itself has not fully deployed and opened within a predetermined length of time, the timer will trigger the pulling mechanism to pull the reserve ripcord.

According to a further feature of the present invention, means may be provided to deactivate the automatic reserve parachute pack opening function upon the successful opening of the main parachute. This deactivation means may be manual or automatic.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 1 is a side view of a parachutist outfitted with a main and reserve parachute arrangement embodying the present invention;

FIG. 2 is an enlarged fragmentary view of the front portion of the arangement of FIG. 1;

FIG. 5 is a perspective view illustrating the manner of operation of the parachute arrangement of FIG. 1 during a jump.

Figure 3:
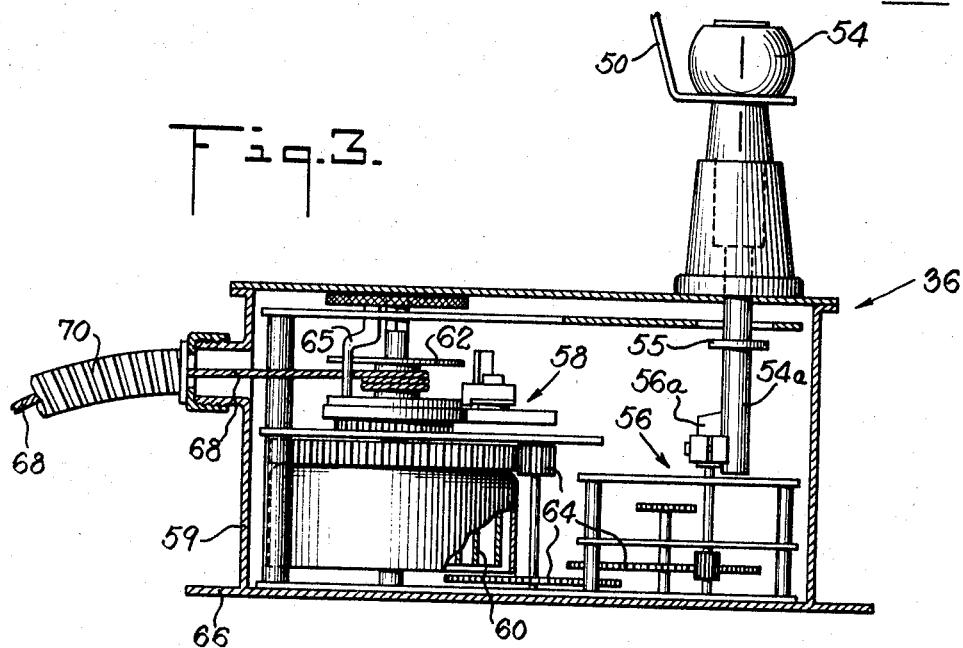
FIG. 3 is an enlarged elevational view, partially cut away, of a timer and a reserve ripcord pulling mechanism forming a portion of the arrangement of FIG. 1.

As shown in FIG. 1, a parachutist 10 is outfitted with a main back parachute pack 12 and a smaller reserve front prachute pack 14. The two parachute packs are basically of well known construction; and they are formed with a plurality of flaps 16 which overlap to enclose parachute canopies and shroud lines (not shown). The undermost of the overlapping flaps is provided with cones 18 which pass through grommets 20 in the upper flaps. In order to keep the upper flaps in place, pins 22 are provided which pass through appropriate holes in the cones 18. The pins 22 are connected to main and reserve ripcords 24 and 26; and the pulling of either of these ripcords will remove its associated pins 22 from the cones 18 allowing the associated parachute pack to open. Elastic bands 28 are provided along the various flaps 16 to pull them back when the cones are released.

The main ripcord 24 is connected to one end of a static line 30. The static line contains a snap hook 32 at its opposite end for attaching to an aircraft. The reserve ripcord 26, on the other hand, is connected to a D-ring 34 by which it may be manually pulled.

A reserve parachute opening arrangement, shown generally at 36 in FIG. 1, is mounted on top of the reserve parachute pack.

The main and reserve parachute packs 12 and 14 are fastened to a common belt harness 38 worn by the parachutist 10.

Turning now to FIG. 2, it will be seen that the reserve parachute pack 14 is fastened by means of snap hooks 40 to snap hook rings 42 on a pair of front straps 44 forming a portion of the harness 38. The harness 38 is also provided with front and rear guide rings 46 and 48 located respectively above and behind the snap hook rings 42. These guide rings serve to guide a connecting line 50 which extends around behind the parachutist and is secured at its far end to the static line 30 near its point of connection to the main ripcord 24. The other end of the connecting line 50 terminates in one portion of a tension sensitive quick disconnect coupling 52. This coupling is preferably made up of two pieces of fabric-like material which exhibit a mutual adhesiveness when pressed together. Material having this characteristic is known by the name "Velcro." When the pieces making up the coupling 52 are cut to a particular size, they will exhibit a corresponding amount of tensile strength in adhesion, so that the amount of pull required to sever or disconnect the coupling 52 can be controlled simply by adjusting the size of its Velcro elements.

The other side of the coupling 52 is connected to a control knob 54 on the top of the reserve parachute opening arrangement 36.

Figure 4:
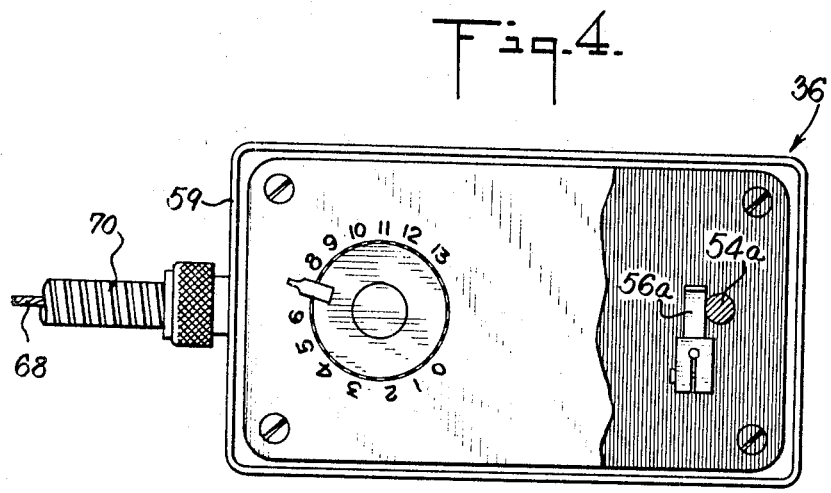
FIG. 4 is a top view of the timer and pulling mechanism of FIG. 3.

Turning now to FIGS. 3 and 4, it will be seen that the reserve parachute opening arrangement 36 is made up of a timer 56 and a spring power mechanism 58 mounted within a housing 59. The spring power mechanism 58 includes a powerful clock spring 60 arranged to drive a winding pulley 62; and, through a system of gears 64 to drive the timing mechanism 56. The timing mechanism 58 limits the rate at which the clock spring 60 can unwind; and because of the very large gear ratio between the spring and timing mechanism, the spring unwinds only a small amount even over the longest set duration. Upon completion of the timing duration, a movable arm 65 carried around by the spring 60, trips a lever which releases the spring from the impeding action of the timing mechanism and allows the full spring force (about 60–80 lbs.) to be applied to the winding pulley 62. The actual mechanical construction of the particular timing and spring mechanism is not critical to be present invention. However the timer ad spring power portion of the United States Air Force Type F–1B (Class 2) Automatic Parachute Ripcord Release mechanism has proven to be quite satisfactory for this purpose.

Because of the large gear ratio between the clock spring 60 and the timing mechanism 56 only a minute force is necessary to control the starting and stopping of the timing mechanism so long as it is applied to the timing mechanism itself. In the present case, as shown in FIGS. 3 and 4, the control knob 54, is coupled to a push rod 54a which moves up and down with the knob 54 out of and into, respectively, the path of movement of a rotatable element 56a of the timing mechanism. Thus by pulling up on the knob 54 the timing mechanism may be set into operation to initiate a timing cycle; and by pushing down on the knob 54 the timing cycle can easily be interrupted.

The knob 54 requires less upward pull to start the timing mechanism than is required to disconnect the coupling 52. However a flange 55 on the knob engages with the casing 59 once the knob is pulled so that it will resist further pulling to an extent such that the coupling 52 will become severed or disconnected.

Reverting to FIG. 2, it will be seen that the housing 59 of the reserve parachute opening arrangement 36 is mounted on a plate 66 which is sewn to an upper one of the flaps 16 of the reserve parachute pack 14.

Also as shown in FIG. 2, a flexible steel pull cord 68 is connected to be wound up on the pulley 62 when it is turned by the clock spring 66. The pull cord 68 passes through a flexible steel guide tube 70 which is affixed at one end to the housing 59 of the reserve parachute opening arrangement 36, and at the other end to a plate 72 on a side one of the flaps 16. The pull cord 68 extends out through the end of the tube 70 and connects as at 74 to the reserve ripcord 26 between the pins 22 and the D-ring 34. As can be seen, both the pull cord 68 and one end of the D-ring 34 pass through a guide loop 76 sewn into one of the flaps 16. Thus the direction of pull exerted on the pins 22 by the pull cord 68 will be the same as that exerted by manually pulling the D-ring 34.

Operation of the above described system can best be appreciated from a consideration of FIG. 5. As there shown, the parachutist 10 has left his aircraft 80 via an exit door 82. The snap hook 32 of his static line 30 is affixed to the aircraft so that when he descends the length of the static line; it will pull on both the main ripcord 24 and on the connecting line 50. The effect of this is to initiate opening of the main parachute pack 12 and to initiate a waiting sequence for the reserve parachute pack 14. If the main parachute does not properly deploy and inflate within a predetermined time (e.g. 10 seconds) then the reserve parachute pack 14 will be opened. This occurs as a result of the connecting line 50 pulling up on the control knob 50 to initiate the timing cycle of the timing mechanism 56. When the control knob is pulled fully upward it will resist further movement thereby increasing the tension applied through the coupling 52 and allowing it to release. In this manner the static and connecting lines 30 and 50 are completely released from the parachutist.

Upon completion of the timing cycle, the clock spring 60 becomes released to turn the winding pulley 62. The pulley in turn winds up the pull cord 68 causing it to pull upon the locking pins 22 in the reserve pack 14 and allowing the pack to open.

Should the main parachute deploy and open properly prior to the preset time duration, then the control knob need merely be pushed down to stop the progress of the timing mechanism 58 and thereby interrupt the timing cycle.

As can be seen in the drawings, the guide ring 46 is located substantially directly above the control knob 54. This ensures that no matter what attitude the parachutist may have when the static line is pulled, the connecting line 50 will always pull the control knob directly out from its housing 59.

It will be appreciated that the arrangements of the presest invention lend themselves well to the application of various automatic and semiautomatic devices for interrupting the timing cycle and preventing the reserve parachute from opening in those instances where the main parachute opens properly within the preselected time. For example, inertial devices, sensitive to the deceleration effects of the opening of the main parachute could be employed. Also radio controlled and/or solenoid operated deactivate mechanisms could be installed with a minimum of difficulty.

It will further be appreciated that the above described system in no way hinders or interferes with the normal manual operation of the reserve chute; and the reserve chute pack may be manually opened at any time either prior to automatic opening or subsequent to deactivation of the automatic system. Thus the added safety features of the present invention do not compromise other safety features already present in the equipment.

Having thus described the invention with particular reference to the preferred form thereof, it will be obvious to those skilled in the art to which the invention pertains, after understanding the invention, that various changes and modifications may be made therein without departing from the spirit and scope of the invention.

What is claimed as new and desired to be secured by Letters Patent is:

1. A parachuting arrangement comprising a first parachute pack having a first ripcord connected to a first pulling means and movable in response to actuation by said pulling means to open said first parachute pack, a reserve parachute pack having a reserve ripcord operable when pulled to open said reserve parachute pack, a triggerable pulling mechanism mounted on said reserve parachute pack and connected to pull said reserve ripcord when triggered, a timing mechanism mounted adjacent said pulling mechanism to trigger same at a predetermined time following starting of said timing mechanism, control means cooperable with said timing mechanism for starting and stopping same, said control means being constructed to start said timing mechanism whenever a predetermined pulling force is applied thereto, and a connecting line interconnecting said control means and said first pulling means whereby the operation of said first pulling means applies a pulling force via said connecting line to said control means thus starting said timing mechanism.

2. A parachuting arrangement as in claim 1 wherein said first pulling means is a static line constructed to be connected between an aircraft and said first ripcord.

3. A parachuting arrangement as in claim 1 wherein said connecting line is constructed to disconnect said pulling means from said control means in response to the imposition on said line of tensile forces greater than required to produce actuation of said timing mechanism.

4. A parachuting arrangement as in claim 1 wherein said timing mechanism is constructed to be deactivated by said control means during operation thereof.

5. A parachuting arrangement as in claim 1 wherein said timing mechanism and said triggerable pulling mechanism are mounted within a casing secured to said reserve parachute pack.

6. A parachuting arrangement as in claim 1 wherein said pulling mechanism includes a spring and a pull cord connected to be pulled by said spring, said pull cord being secured to said reserve ripcord.

7. A parachuting arrangement as in claim 5 wherein said control means includes a reciprocally movable control knob arranged to start and stop operation of said timing mechanism.

8. A parachuting arrangement as in claim 7 wherein said control knob is manually movable in a direction to stop operation of said timing mechanism.

9. A parachuting arrangement as in claim 1 wherein said timing mechanism includes a movable element for triggering said pulling mechanism and said control means includes reciprocally movable means cooperable with said timing mechanism, and constructed to move into and out of the path of movement of said movable element whereby said timing mechanism is stopped when said reciprocally movable means is in said path and is started when said reciprocally movable means is out of said path.

10. A parachuting arrangement as in claim 9 wherein said connecting line is connected to said reciprocally movable means of said control means in such a manner that the operation of said first pulling means will move said reciprocable means out of said path.

References Cited

FOREIGN PATENTS 138,819    1961    U.S.S.R.

MILTON BUCHLER, *Primary Examiner.*
RICHARD A. DORNON, *Assistant Examiner.*

U.S. Cl. X.R.
244—150; 294—83; 74—2